3,085,889
EMULSIONS STABILIZED AGAINST FREEZING
Thomas G. Swift, East Hempfield Township, Lancaster County, Pa., assignor to Armstrong Cork Company, Lancaster, Pa., a corporation of Pennsylvania
No Drawing. Filed Mar. 17, 1960, Ser. No. 15,526
12 Claims. (Cl. 106—219)

This invention relates to "oil-in-water" type emulsions and more particularly the invention relates to a means of stablizing such emulsions from breakdown due to alternate freezing and thawing of the aqueous or continuous phase.

When products, such as adhesives and paints, contain "oil-in-water" type emulsions, it has been found necessary to stabilize them against freezing temperatures sometimes encountered during shipping and storage in the winter months. If an "oil-in-water" emulsion type product is frozen, it will "break" when permitted to thaw. The term "break" means generally that the emulsion separates into two phases.

The primary object of this invention is to provide stabilized emulsions which can be frozen and thawed several times without breaking or losing their original properties.

Another object of this invention is to provide a method of stabilizing "oil-in-water" type emulsions, such as those used in adhesives and paints, against breakdown and deterioration due to alternate freezing and thawing.

These and other objects have been accomplished by dissolving stabilizing quantities of sorbitol in the prepared emulsions. Emulsions thus stabilized are satisfactory in that they do not break after being subjected to alternate freezing and thawing.

The amount of d-Sorbitol necessary to impart freeze-thaw stability has been found to vary depending upon the type of emulsion, the emulsifying agents used, and the percent solids of the solution, the higher the percent solids the more sorbitol required. The following table gives the range of the amount of d-Sorbitol, based upon the total weight of the stabilized emulsion, necessary for imparting freeze-thaw stabilization to several types of emulsions.

TABLE I

| Type of emulsion: | Percent by weight d-sorbitol required for stabilization |
|---|---|
| Asphalt emulsions— | |
| A. Soap type | 1.0– 5.0 |
| B. Soap-clay type | 0.5–10.0 |
| C. Clay type | 0.5– 5.0 |
| Resin emulsions | 0.5–15.0 |
| Rubber emulsions | 5.0–35.0 |
| Asphalt-rubber emulsions | 0.5– 5.0 |
| Rubber-resin emulsions | 1.0–15.0 |

Generally speaking, the upper limit of the amount of d-Sorbitol that can be added to an emulsion is governed by the following: a large amount will decrease the viscosity of the emulsion; a large amount will sometimes decrease the water and alkali resistance of the emulsion; and the cost of d-Sorbitol may limit the feasibility of adding a large amount to an emulsion.

In order to form an emulsion, three chief ingredients are needed: the insoluble material to be emulsified, the water, and an emulsifying agent. The emulsifying agent acts to lower the interfacial tension so that extremely fine drops of the insoluble ingredient are easily formed throughout the water phase. Upon emulsification, the emulsifying agent provides a film surrounding each particle which prevents it from combining with other particles or, in the case of clay, provides colloidal particles which separate the individual droplets. When the emulsion is unstable, the emulsifying agent does not sufficiently protect each droplet and thus the emulsified droplets combine in an unstable system. Often times emulsions that are stable at normal temperatures become unstable when subjected to freezing conditions thus, when the emulsion is thawed, the droplets combine and the emulsion breaks.

In determining freeze-thaw stability of the various types of emulsions illustrated in the following examples, 100 grams of the type of emulsion under consideration was subjected to a temperature of 0° F. for approximately eighteen hours and then allowed to thaw at room temperature for six hours. Freeze-thaw stability was considered satisfactory if the emulsion did not break during any three cycles. In order to determine whether or not the emulsion broke during the freeze-thaw cycles, the emulsions were visually checked and, if there was either a phase separation or if the emulsion had gelled, the emulsion was considered broken.

A fuller understnading of the invention may be had by reference to the examples, which are intended to illustrate but not to limit the invention.

*Example I*

An asphalt emulsion was prepared using a soap type emulsifier, the emulsion having the following composition:

| Ingredients— | Percent by weight |
|---|---|
| Asphalt (125–135 penetration) | 50.0 |
| Polymerized fatty acid (molecular weight approximately 600) | 5.0 |
| Monoethanolamine | 1.5 |
| Water | 41.5 |
| Crystalline d-Sorbitol (powder) | 2.0 |

Five parts by weight of fatty acid was blended with 50 parts by weight asphalt which had been preheated to 190° F. This blend was then slowly added to a mixture of 1.5 parts by weight of monoethanolamine and 41.5 parts by weight of water, which mixture was at a temperature of approximately 100° F. This addition took place in a Sunbeam Mixmaster mixer with rapid agitation in order to get a fine dispersion of the oil phase. Two parts by weight of powdered d-Sorbitol was dissolved in the emulsion after the dispersion of the oil phase was completed.

In order to determine the freeze-thaw stability of the emulsion, 100 grams of the emulsion was subjected to a temperature of 0° F. for approximately eighteen hours and then allowed to thaw at room temperature for six hours, the freezing and thawing constituting one cycle. This emulsion was subjected to six freeze-thaw cycles without breaking.

A similar asphalt emulsion was prepared as above described except that the addition of the powdered d-Sorbitol was omitted and 100 grams of this emulsion was subjected to the freeze-thaw cycle above described. This emulsion broke during the first freeze-thaw cycle.

*Example II*

This example illustrates an asphalt emulsion in which the asphalt is emulsified by using a soap-clay type emulsifier. The procedure followed for preparing the emulsion was basically the same as the procedure described in Example I. The hot asphalt was dispersed in a mixture of the clay, sodium resinate, and water, the powdered d-Sorbitol being added to the emulsion after the dispersion of the oil phase was completed. The composition of the soap-clay type emulsified asphalt system was as follows:

| Ingredients— | Percent by weight |
|---|---|
| Asphalt (125–135 penetration) | 50.0 |
| Bentonite clay (200 mesh) | 3.0 |

| Ingredients— | Percent by weight |
|---|---|
| Sodium resinate | 3.0 |
| d-Sorbitol (powder) | 2.0 |
| Water | 42.0 |

The emulsion prepared as described in Example II was subjected to four freeze-thaw cycles without breaking. When an emulsion was prepared without the addition of the powdered d-Sorbitol, the emulsion broke during the first freeze-thaw cycle.

*Example III*

Example III illustrates an asphalt emulsion which has been prepared with a clay type emulsifier. In the preparation of this emulsion, the clay was initially predispersed in the water to form a slurry into which the molten asphalt, which was agitated to insure dispersion and maintained at a temperature between 190° F. and 220° F., was slowly dispersed. The composition of the emulsion was as follows:

| Ingredients— | Percent by weight |
|---|---|
| Asphalt (125–135 penetration) | 50.0 |
| Bentonite clay (200 mesh) | 3.0 |
| d-Sorbitol (powder) | 3.0 |
| Water | 44.0 |

This emulsion, when tested under the same conditions as the emulsions prepared in Examples I and II, did not break after being subjected to four freeze-thaw cycles. An emulsion prepared in the same way, except that d-Sorbitol was omitted from the final composition, did not possess freeze-thaw stability and the emulsion broke when frozen and thawed.

*Example IV*

The procedure for preparing an asphalt-rubber emulsion was as follows: The asphalt and fatty acid were initially blended at 190° F. The bentonite clay was dispersed in the water and the amine was blended with the clay slurry in a Sunbeam Mixmaster mixer. The asphalt-fatty acid phase was then slowly added to the water phase with agitation after which the latex emulsion was added as the dispersion cooled. Powdered d-Sorbitol was then added to the final emulsion to give the following composition:

| Ingredients— | Percent by weight |
|---|---|
| Asphalt (125–135 penetration) | 50.0 |
| Polymerized fatty acid (molecular weight approximately 600) | 9.0 |
| Monoethanolamine | 3.0 |
| Commercial GR–S butadiene-styrene copolymer latex emulsion (60% solids) | [1] 20.0 |
| d-Sorbitol (powder) | 3.0 |
| Bentonite clay | 1.0 |
| Water | 14.0 |

[1] Wet basis.

This emulsion was subjected to six freeze-thaw cycles using the same procedure described as that under Examples I to III, inclusive. The emulsion did not break. In the absence of d-Sorbitol, an emulsion prepared as above described broke when frozen and thawed.

*Examples V and VI*

A rubber-resin emulsion and a resin emulsion were prepared so as to have the following compositions:

RUBBER-RESIN EMULSION

| Ingredients— | Percent by Weight |
|---|---|
| Triethylene glycol ester of hydrogenated rosin | 50.0 |
| Toluol | 5.0 |
| Tall oil fatty acids (6% rosin) | 2.0 |
| Monoethanolamine | 0.5 |
| Commercial GR–S butadiene-styrene copolymer latex emulsion (60% solids) | [1] 20.0 |
| d-Sorbitol (powder) | 15.0 |
| Water | 7.5 |

[1] Wet basis.

RESIN EMULSION

| Ingredients — | Percent by weight |
|---|---|
| Triethylene glycol ester of hydrogenated rosin | 50.0 |
| Toluol | 5.0 |
| Tall oil fatty acids (6% rosin) | 2.0 |
| Monoethanolamine | 0.5 |
| d-Sorbitol (powder) | 10.0 |
| Water | 32.5 |

The procedure used for the preparation of the rubber-resin emulsion was as follows: The resin and toluol were first mixed using a conventional laboratory stirrer and the acid was then blended into the resin solution. The amine and water were blended and this mixture was slowly added to the resin solution with rapid agitation. The latex was then added with moderate agitation after all of the water phase had been added and the d-Sorbitol was then dissolved in the final emulsion. This emulsion did not break after being subjected to four freeze-thaw cycles. During one cycle, 100 grams of the emulsion was subjected to a temperature of 0° F. for approximately eighteen hours and then allowed to thaw at room temperature for six hours. Again, when an emulsion was prepared without powdered d-Sorbitol being added as a final step, the emulsion broke on freezing and thawing.

The resin emulsion was prepared in the same manner as described for the preparation of the rubber-resin emulsion. Again, the d-Sorbitol provided freeze-thaw stability, and the emulsion did not break when subjected to four freeze-thaw cycles. The omission of d-Sorbitol from this composition caused the emulsion to break during the first cycle when frozen and thawed.

*Example VII*

A rubber dispersion was stabilized with powdered d-Sorbitol by dissolving 35 parts by weight powdered d-Sorbitol in 65 parts by weight of a commercial GR–S butadiene-styrene copolymer latex emulsion (60% solids). This emulsion proved to be stable after being subjected to four freeze-thaw cycles whereas the non-stabilized commercial latex emulsion broke after being frozen and thawed.

*Example VIII*

75 parts by weight of an aqueous neoprene latex emulsion (No. 733 manufactured by E. I. du Pont de Nemours) containing 40% solids by weight was stabilized by dissolving 25 parts by weight d-Sorbitol in the prepared emulsion. The emulsion remained stable after being subjected to four freeze-thaw cycles whereas the commercial emulsion which had not been stabilized with d-Sorbitol broke on freezing and thawing.

I claim:

1. A method of protecting an emulsion in which water is the continuous phase and in which the emulsion is selected from the group consisting of an asphalt emulsion, a resin emulsion, a rubber emulsion, an asphalt-rubber emulsion, and a resin-rubber emulsion against deterioration due to freezing and thawing which comprises dissolving from 0.5 to 35% by weight of sorbitol, based upon the total weight of the emulsion and sorbitol, in said emulsion.

2. A method in accordance with claim 1 in which the emulsion is an asphalt emulsion and in which the amount of sorbitol is from 0.5 to 10.0% by weight based on the total weight of th asphalt emulsion and sorbitol.

3. A method in accordance with claim 1 in which the emulsion is a resin emulsion and in which the amount of sorbitol is from 0.5 to 15.0% by weight based on the total weight of the resin emulsion and sorbitol.

4. A method in accordance with claim 1 in which the emulsion is a rubber emulsion and in which the amount of sorbitol is from 5.0 to 35.0% by weight based on the total weight of the rubber emulsion and sorbitol.

5. A method in accordance with claim 1 in which the emulsion is an asphalt-rubber emulsion and in which the amount of sorbitol is from 0.5 to 5.0% by weight based on the total weight of the asphalt-rubber emulsion and sorbitol.

6. A method in accordance with claim 1 in which the emulsion is a rubber-resin emulsion and in which the amount of sorbitol is from 1.0 to 15.0% by weight based on the total weight of the rubber-resin emulsion and sorbitol.

7. An emulsion in which water is the continuous phase and in which the emulsion is selected from the group consisting of an asphalt emulsion, a resin emulsion, a rubber emulsion, an asphalt-rubber emulsion, and a resin-rubber emulsion and from 0.5 to 35.0% by weight, based upon the total weight of the emulsion and sorbitol, of sorbitol dissolved therein.

8. An asphalt emulsion in which water is the continuous phase having from 0.5 to 10.0% by weight, based upon the total weight of the emulsion and sorbitol, of sorbitol dissolved therein.

9. A resin emulsion in which water is the continuous phase having 0.5 to 15.0% by weight, based upon the total weight of the emulsion and sorbitol, of sorbitol dissolved therein.

10. A rubber emulsion in which water is the continuous phase having from 5.0 to 35.0% by weight, based up the total weight of the emulsion and sorbitol, of sorbitol dissolved therein.

11. An asphalt-rubber emulsion in which water is the continuous phase having from 0.5 to 5.0% by weight, based upon the total weight of the emulsion and sorbitol, of sorbitol dissolved therein.

12. A resin-rubber emulsion in which water is the continuous phase having from 1.0 to 15.0% by weight, based upon the total weight of the emulsion and sorbitol, of sorbitol dissolved therein.

References Cited in the file of this patent

UNITED STATES PATENTS

| | | |
|---|---|---|
| 2,314,242 | Porter | Mar. 16, 1943 |
| 2,782,169 | Brown et al. | Feb. 19, 1957 |
| 2,881,084 | Watkins | Apr. 7, 1959 |